United States Patent [19]

Koscinski, Jr.

[11] Patent Number: 5,445,487
[45] Date of Patent: Aug. 29, 1995

[54] BOOM LIFT APPARATUS MOUNTABLE TO DIFFERENT SUPPORT STRUCTURES

[76] Inventor: Stanley Koscinski, Jr., 5009 Old Middleburg Rd., Jacksonville, Fla. 32210

[21] Appl. No.: 163,289

[22] Filed: Dec. 7, 1993

[51] Int. Cl.⁶ .............................................. B60P 1/54
[52] U.S. Cl. .................... 414/543; 414/550; 212/232
[58] Field of Search .............. 414/496, 543, 550, 563, 414/569; 212/180, 244

[56] References Cited

U.S. PATENT DOCUMENTS

| | | | |
|---|---|---|---|
| 2,509,950 | 5/1950 | Zierke | 414/543 |
| 2,661,854 | 12/1953 | Adams. | |
| 2,947,425 | 8/1960 | Nichols | 414/543 X |
| 3,306,467 | 2/1967 | Weempe | 414/550 X |
| 3,899,089 | 8/1975 | Wardlaw. | |
| 4,069,922 | 1/1978 | Hawkins | 414/543 X |
| 4,671,731 | 6/1987 | Harlan | 414/550 |
| 5,064,078 | 11/1991 | Van Staveren | 212/180 |
| 5,211,526 | 5/1993 | Rabinette | 414/543 X |
| 5,281,078 | 1/1994 | Mills, Jr. | 414/563 X |

OTHER PUBLICATIONS

Publication Entitled "Rescue & Retrieval Systems'- '-DBl/Sala TM L1850 Davit Arm, 1 page.

Primary Examiner—Michael S. Huppert
Assistant Examiner—James W. Keenan
Attorney, Agent, or Firm—John R. Flanagan

[57] ABSTRACT

A boom lift apparatus includes a boom assembly having an elongated lower mast member, an elongated upper boom member and a coupler member connected to a lower end of the upper boom member and an upper end of the lower mast member such that the upper boom member extends in a cantilevered inclined relationship to the lower mast member, and a plurality of different mounting members, each being adapted to mount the boom assembly at a lower end of the lower mast member to a different one of a plurality of different support structures.

14 Claims, 2 Drawing Sheets

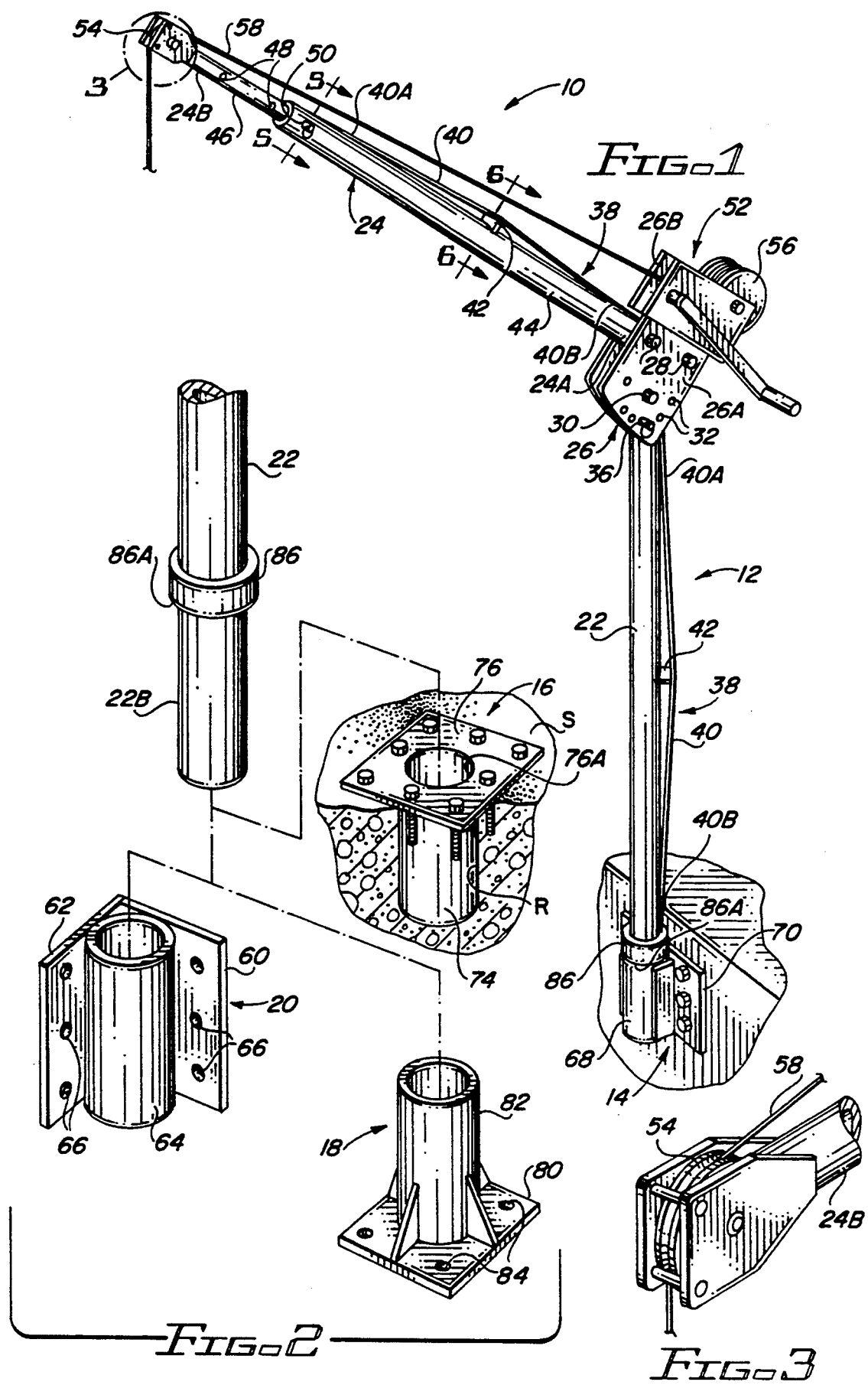

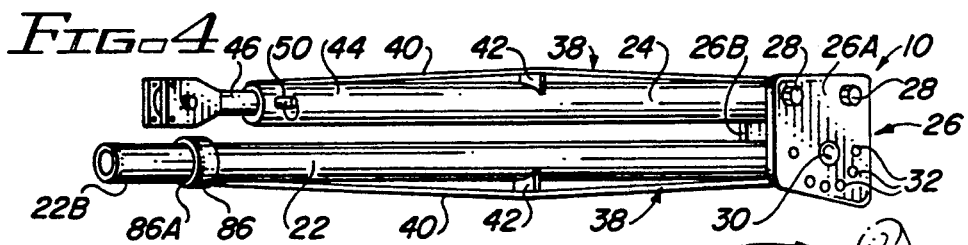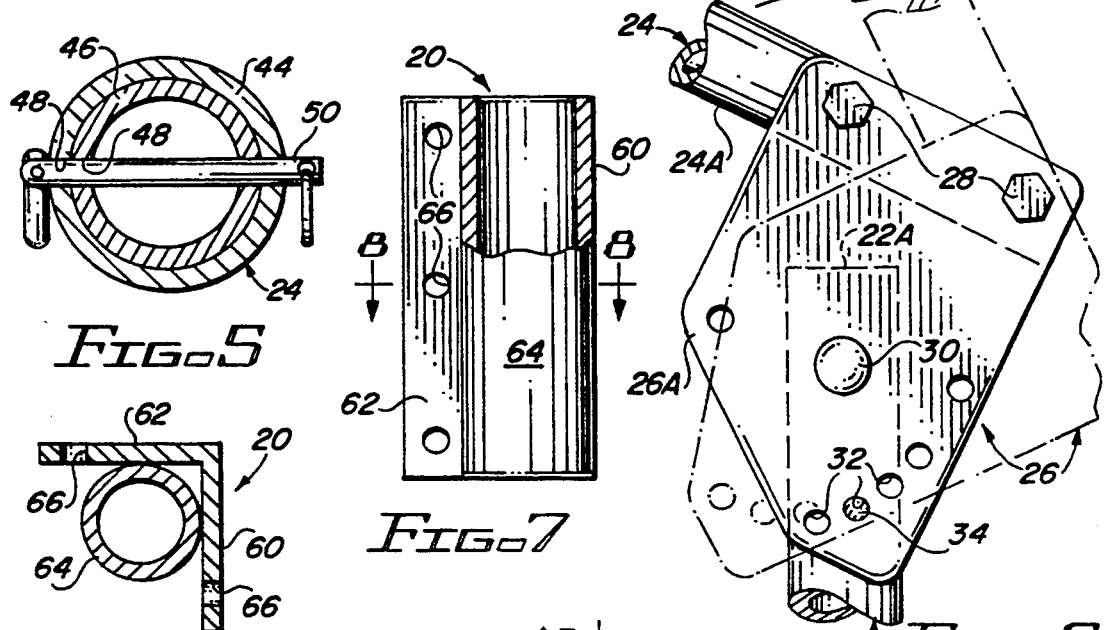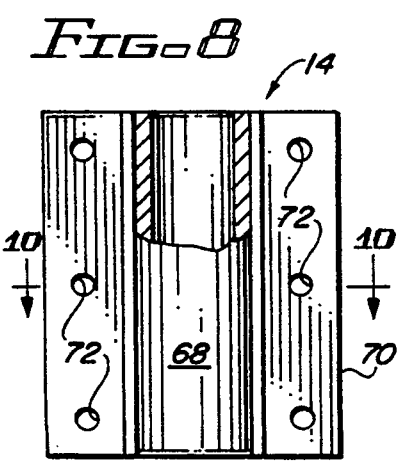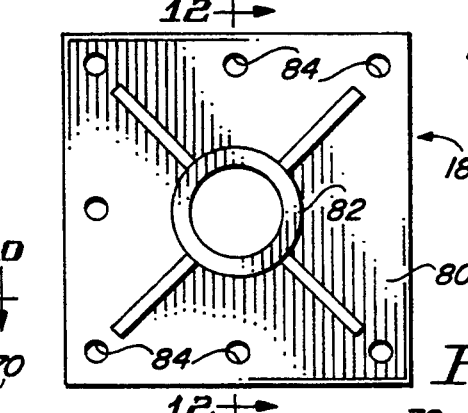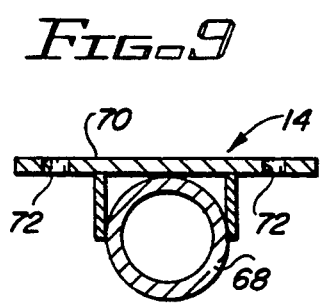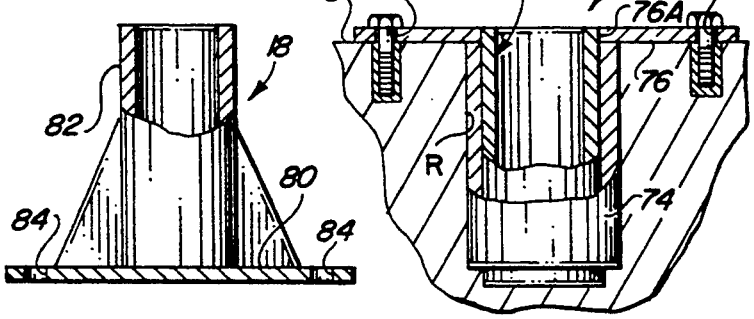

BOOM LIFT APPARATUS MOUNTABLE TO DIFFERENT SUPPORT STRUCTURES

BACKGROUND OF THE INVENTION

1. Field of the Invention

The present invention generally relates to hoist apparatus for use in lifting and lowering personnel and materials in confined spaces and, more particularly, is concerned with a boom lift apparatus mountable to a plurality of different support structures.

2. Description of the Prior Art

A variety of diverse hoists are found in the prior art for lifting, lowering and moving loads from one location to another. Some of these hoists are portable in nature in that they are mountable, for instance, on a bumper, load bed, box or other part of a vehicle, such as a pickup truck, in a deployed condition during periods of use and then can be converted to a collapsed position for storage during periods of nonuse.

Representative examples of these hoists in the prior art are the ones disclosed in U.S. patents to Adams (U.S. Pat. No. 2,661,854), Wardlaw (U.S. Pat. No. 3,899,089), Harlan (U.S. Pat. No. 4,671,731) and Van Staveren (U.S. Pat. No. 5,054,078). Another example of a hoist is an apparatus identified as a DBI/SALA TM davit arm system marketed by D B Industries, Inc. of Red Wing, Minn. Both the DBI davit arm and the hoist of the Van Staveren patent have similar overall constructions. Each employs a lower vertical mast and an upper boom arm pivotally mounted in an inclined relationship to the lower vertical mast for undergoing movement in a vertical plane relative to the vertical mast. The upper boom arm of Van Staveren is telescopically extendable and can be actuated (raised or lowered) relative to the lower vertical mast by action of a hydraulic cylinder pivotally attached between the lower vertical mast and upper boom arm. The upper boom arm of the BDI/SALA TM davit arm system supports a winch and cable for use in lifting and lowering loads.

While the overall construction of the DBI/SALA TM davit arm and the hoist of the Van Staveren patent appears to be a step in the right direction, both of these hoists appear to be restricted to a particular type of location where they can be employed to assist in lifting and moving loads. Consequently, a need still exists for a boom lift assembly which will overcome the restrictions of the prior art, particularly of the DBI/SALA TM davit arm and the Van Staveren hoist.

SUMMARY OF THE INVENTION

The present invention provides a boom lift apparatus designed to satisfy the aforementioned need. The boom lift apparatus of the present invention is adapted to be mounted to a plurality of different support structures so as to accommodate use of the boom lift apparatus in close and confined spaces, for example in a manhole, on a truck bumper, or upon a flat support surface.

Accordingly, the present invention is directed to a boom lift apparatus adapted for mounting to a plurality of different support structures. The boom lift apparatus comprises: (a) a boom assembly having an elongated lower mast member, an elongated upper boom member and a coupler member connected to a lower end of the upper boom member and an upper end of the lower mast member such that the upper boom member extends in a cantilevered inclined relationship to the lower mast member; and (b) a plurality of different mounting members, each being adapted to mount the boom assembly at a lower end of the lower mast member thereof to one of a plurality of different support structures.

A first one of the mounting members is a vertical surface-mountable anchor bracket. The first anchor bracket includes a tube adapted to receive and seat the lower end of the lower mast member, and a flat plate attached along a side of the tube and being adapted for attachment to a vertical surface of a support structure.

A second one of the mounting members is a recess-mountable anchor bracket. The second anchor bracket includes a tube adapted to extend into a recess defined in a surface of a support structure and to receive and seat the lower end of the lower mast member in the tube, and a flat plate having a central opening and being attached about the central opening to a receiving end of the tube, the flat plate being adapted for attachment to the surface of the support structure.

A third one of the mounting members is a horizontal surface-mountable anchor bracket. The third anchor bracket includes a flat plate adapted for attachment upon a surface of a support structure, and a tube attached at one end upon the flat plate and being adapted to extend outwardly therefrom and receive and seat the lower end of the lower mast member in the tube.

A fourth one of the mounting members is a corner-mountable anchor bracket. The fourth anchor bracket includes a pair of flat plates each being attached to the other along a respective edge thereof so as to dispose the flat plates in an angled relationship with one another and define a corner therebetween matching a corner of a support structure, the flat plates being adapted for attachment to the support structure, and a tube adapted to receive and seat the lower end of the lower mast member, the tube being attached along a side thereof to the pair of flat plates at the corner therebetween.

The boom lift apparatus may also include a winch mechanism for use in lifting and lowering loads. The winch mechanism includes a pulley rotatably mounted to an upper end of the upper boom member, a winch mounted upon the coupler member, and a cable wound at one end portion on the winch and extending over the pulley and downward therefrom to a free end for connection to a load.

Also, the present invention is directed to a boom assembly which comprises: (a) an elongated lower mast member; (b) an elongated upper boom member; (c) a coupler member fixedly connected to a lower end of the upper boom member and pivotally mounted to an upper end of the lower mast member such that the lower mast member is convertible relative to the upper boom member and coupler between a stored position in which the upper boom member and lower mast member extend alongside one another and a selected one of a plurality of different deployed positions in which the upper boom member extends in a cantilevered inclined relationship to the lower mast member; (d) first means on the coupler and lower mast member for defining the plurality of different deployed positions of the upper boom member relative to the lower mast member; and (e) second means for releasably latching the lower mast member to the coupler at a selected one of the plurality of deployed positions defined by the first means on the coupler member.

More particularly, the first means is a plurality of passages defined through the coupler member and a single passage defined through the upper end of the lower mast member and spaced from the pivot connection between the upper end of the lower mast member and the coupler member. The plurality of passages is arranged along a generally arcuate path such that each passage through the coupler member can be brought into alignment with the single passage through the lower mast member as the coupler member and upper boom member are pivoted relative to the lower mast member in order to select one of the plurality of discrete deployed positions defined by plurality of passages through the coupler member. The second means is a latch pin insertable through the selected one of the passages in the coupler member and the single passage through the lower mast member being aligned therewith.

Further, the boom assembly includes a separate elongated preload structure attached along a side of each of the upper boom member and the lower mast member so as to apply a preload fore thereto in a direction opposite to a force applied thereto by a load supported by the boom assembly.

These and other feature as and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a boom assembly of a boom lift apparatus of the present invention, showing the boom assembly disposed in a deployed position and mounted by one of a plurality of different mounting members on one of a plurality of different support structures, such as a vertical surface-mountable anchor bracket attached on a vertical surface of a manhole structure.

FIG. 2 is a perspective view of the other mounting members of the plurality thereof which are part of the boom lift assembly, namely, a recess-mountable anchor bracket, a horizontal surface-mountable anchor bracket, and a corner-mountable anchor bracket.

FIG. 3 is an enlarged fragmentary perspective view of a terminal end of an upper boom member of the boom assembly as enclosed by the circle 3 of FIG. 1.

FIG. 4 is a side elevational view of the upper boom member and a lower mast member of the boom assembly in a folded, stored or collapsed position.

FIG. 5 is an enlarged cross-sectional view of the upper boom member taken along line 5—5 of FIG. 1.

FIG. 6 is an enlarged fragmentary side elevational view of a coupler member of the boom assembly.

FIG. 7 is an enlarged elevational view, partly in section, of the corner-mountable anchor bracket which is also shown in FIG. 2.

FIG. 8 is a cross-sectional view of the cornermountable anchor bracket taken along line 8—8 of FIG. 7.

FIG. 9 is an enlarged elevational view, partly in section, of the vertical surface-mountable anchor bracket which is also shown in FIG. 1.

FIG. 10 is a cross-sectional view of the vertical surface-mountable anchor bracket taken along line 10—10 of FIG. 9.

FIG. 11 is an enlarged top plan view of the horizontal surface-mounted anchor bracket which is also shown in FIG. 2.

FIG. 12 is a cross-sectional view of the horizontal surface-mounted anchor bracket taken along line 12—12 of FIG. 11.

FIG. 13 is an enlarged longitudinal elevational view, partly in section, of the recess-mountable anchor bracket disposed in a recess in the support structure which is also shown in FIG. 2.

DETAILED DESCRIPTION OF THE INVENTION

Referring to the drawings, and particularly to FIGS. 1 to 3, there is illustrated a boom lift apparatus, generally designated 10, of the present invention. The boom lift apparatus 10 basically includes a boom assembly 12 and a plurality of different mounting members in the form of anchor brackets, namely, a vertical surface-mountable anchor bracket 14 (FIG. 1), a recess-mountable anchor bracket 16 (FIG. 2), a horizontal surface-mountable anchor bracket 18 (FIG. 2) and a corner-mountable anchor bracket 20 (FIG. 2). The different anchor brackets 14, 16, 18 and 20 are used to mount the boom assembly 12 to a plurality of different support structures which correspond to the different anchor brackets so as to accommodate use of the boom lift apparatus 10 in close and confined spaces, for example in a manhole, on a truck bumper, or upon a flat support surface.

Basically, the boom assembly 12 includes an elongated lower mast member 22, an elongated upper boom member 24 and a coupler member 26. The coupler member 26 includes a pair of spaced side plates 26A, 26B being fixedly connected by a pair fasteners 28 to a opposite sides of a lower end 24A of the upper boom member 24 and pivotally mounted by a pivot pin 30 to an upper end 22A of the lower mast member 22. The upper boom member 24 and coupler member 26 are convertible relative to the lower mast member 22 between a collapsed or stored position, as seen in FIG. 4 in which the upper boom member 24 and lower mast member 22 extend alongside one another and a selected one of a plurality of different deployed positions, as seen in FIG. 1, in which the upper boom member 24 extends in a cantilevered inclined relationship from the lower most member 22.

The boom assembly 12 also includes first means on the coupler member 26 and lower mast member 22 for defining the plurality of different deployed positions of the upper boom member 24 relative to the lower mast member 22, and second means for releasably latching the lower mast member 22 to the coupler member 26 at the selected one of the plurality of deployed positions. More particularly, the first means is a plurality of passages 32 defined through the coupler member 26 (each passage is actually in the form of a pair of aligned holes defined in the opposite side plates 26A, 26B forming the coupler member 26) and a single passage 34 defined through the upper ed 22A of the lower mast member 22. The single passage 34 is spaced from the pivot pin 30 pivotally connecting the upper end 22A of the lower mast member 22 witch the coupler member 26. As shown in FIGS. 1 and 6, the plurality of passages 32 are arranged along a generally arcuate path such that each passage 32 through the coupler member 26 can be brought into alignment with the single passage 34 through the lower mast member 22 as the coupler member 26 and upper boom member 24 are pivoted together relative to the lower mast member 22 in order to select the desired one of the plurality of discrete deployed positions defined by the plurality of passages 32 through the coupler member 26 The second means is a latch pin 36 insertable through the selected one of the passages 32 in the coupler member 26 and the single passage 34 through the lower mast member 22 being aligned therewith.

The boom assembly 12 further includes a separate elongated preload structure 38 attached along a side of each of the upper boom member 24 and the lower mast member 22 so as to apply a preload force thereto in a direction opposite to a force applied thereto by a load supported by the upper boom member 24. The elongated preload structure 38 is constructed of an elongated rigid rod 40 fixedly attached at opposite ends 40A, 40B to the respective one of the upper boom member 24 and the lower mast member 22 and extending therealong, and a tab 42 wedged between the respective one of the upper boom member 24 and lower mast member 22 and the middle of the rod 40 so as to cause the rod to bow outwardly therefrom and in such manner impose the preload force on and thereby strengthen the respective upper boom member 24 and lower mast member 22.

The upper boom member 24 may include an inner boom portion 44 and an outer boom portion 46. The outer boom portion 46 is telescopically extendable and retractable relative to and within the inner portion 44 in order to adjust the overall length of he upper boom member 24. The inner and outer boom portions 44, 46 have a plurality of holes 48 defined therein, with a pair thereof being alignable at different extended positions of the outer boom portion 46 relative to the inner boom portion 44 to receive a latch pin 50 therethrough to retain the inner and outer bottom portions 44, 46 at the selected position. As seen in FIGS. 1 and 5, the elongated preload structure 38, is mounted to the inner boom portion 44 of the upper boom member 24.

The boom lift apparatus 10 may also include a winch mechanism 52 for use in lifting and lowering loads. The winch mechanism 52 includes pulley 54 rotatably mounted to an upper end 24B of the upper boom member 24, a winch 56 mounted upon the coupler member 26, and a cable 58 wound at one end portion on the winch 56 and extending over the pulley 54 and downward to a free end for connection to a load.

The plurality of different mounting members in the form of aforementioned anchor brackets 14, 16, 18 and 20 are illustrated in FIGS. 1, 2 and 7-13.

In FIGS. 2, 7 and 8, there is shown the corner-mountable anchor bracket 20. The corner-mountable anchor bracket 20 includes a pair of flat plates 60, 62 and a tube 64. The flat plates 60, 62 are rigidly attached to one another along a respective adjacent edges thereof so as to dispose the flat plates 60, 62 in an angled relationship with one another and define a corner therebetween matching a corner of a support structure. The flat plates 60, 62 have a plurality of apertures 66 defined therethrough adapting the anchor bracket 20 for attachment to the respective corner support structure. The tube 64 is adapted to receive and seat a lower end 22B of the lower mast member 22. The tube 64 is rigidly attached between opposite ends thereof and along a side thereof to the pair of flat plates 60, 62 at the corner therebetween.

In FIGS. 1, 9 and 10, there is shown the vertical surface-mountable anchor bracket 14. The vertical surface-mountable anchor bracket 14 includes a tube 68 adapted to receive and seat %he lower end 22B of the lower mast member 22, and a flat plate 70 attached along a side of the tube 68 and extending between opposite ends thereof. The flat plate 70 has a plurality of apertures 72 defined therein adapting the anchor bracket 14 for attachment to a vertical surface V (FIG. 1) of a support structure.

In FIGS. 2 and 13, there is shown the recess-mountable anchor bracket 16. The recess-mountable anchor bracket 16 includes a tube 74 adapted to extend into a recess R defined in a surface S of a support structure and to receive and seat the lower end 22B of the lower mast member 22 in the tube 74, and a flat plate 76 having a central opening 76A and being attached about the central opening 76A to a receiving end of the tube 74. The flat plate 76 includes a plurality of apertures 78 adapting the anchor bracket 16 for attachment to the surface S of the support structure.

In FIGS. 2, 11 and 12, there is shown the horizontal surface-mountable anchor bracket 18. The horizontal surface-mountable anchor bracket 18 includes a flat plate 80 and a tube 82 rigidly attached at one end upon the flat plate 80 and extending outwardly therefrom to receive and seat the lower end 22B of the lower mast member 22 in the tube 82. The flat plate 80 has a plurality of apertures 84 defined therethrough adapting the anchor bracket 18 for attachment upon a horizontal surface of a support structure.

The lower end 22B of the lower mast member 22 has an annular collar 86 attached thereabout which defines a downwardly facing annular shoulder 86A which will rest on the top edge of the tube 64, 68, 74 and 82 of each of the respective anchor brackets 20, 14, 16 and 18 when the lower end 22B of the lower mast member 22 is inserted therein. Such mounting relationship permits the boom assembly 12 to be freely rotated or swung through 360° relative to the respective anchor bracket.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A boom lift apparatus, comprising:
   (a) a boom assembly having an elongated lower mast member, an elongated upper boom member and a coupler member connected to a lower end of said upper boom member and an upper end of said lower mast member such that said upper boom member extends in a cantilevered inclined relationship to said lower mast member; and
   (b) a plurality of different mounting members, each being adapted to mount said boom assembly at a lower end of said lower mast member to different one of a plurality of different support structures, said different mounting members including
      (i) a vertical surface-mountable anchor bracket having a tube adapted to receive and seat said lower end of said lower mast member, and a flat plate being attached to said tube between opposite ends and along a side of said tube, said flat plate being adapted for attachment to a vertical surface of a support structure, and
      (ii) a recess-mountable anchor bracket having a tube adapted to extend into a recess defined in a surface of a support structure and to receive and seat said lower end of said lower mast member in said tube, and a flat plate having a central opening and being attached about the central opening to a receiving end of the tube, said flat plate being adapted for attachment to the surface of the support structure;

(c) said lower end of said lower mast member when received and seated into either one of said tubes of said respective anchor brackets defining a mounting relationship therewith permitting said boom assembly to be rotated relative to said respective anchor bracket.

2. The apparatus of claim 1 further comprising:

a winch mechanism operable to lift and lower a load, said winch mechanism including a pulley rotatably mounted to an upper end of said upper boom member, a rotatable winch mounted upon said coupler member, and a flexible cable wound at one end portion on said winch and extending over said pulley and downward to a free end for connection to the load.

3. The apparatus of claim 1 wherein said coupler member is fixedly connected to said lower end of said upper boom member and pivotally connected to said upper end of said lower mast member such that said upper boom member and coupler member are convertible relative to said lower mast member between a stored position in which said upper boom member extends alongside said lower mast member and a deployed position in which said upper boom member extends in a cantilevered inclined relationship to said lower mast member.

4. The apparatus of claim 1 further comprising:

first means on said coupler member and said lower mast member for defining a plurality of different discrete deployed positions of said upper boom member relative to said lower mast member.

5. The apparatus of claim 4 wherein said first means includes a plurality of passages defined through said coupler member and a single passage defined through said upper end of said lower mast member and spaced from the pivot connection between said upper end of said lower mast member and said coupler member, said plurality of passages being arranged along a generally arcuate path such that each passage through said coupler member can be brought into alignment with said single passage through said lower mast member by pivoting said coupler member and upper boom member relative to said lower mast member in order to select one of said plurality of discrete deployed positions defined by said plurality of passages through said coupler member.

6. The apparatus of claim 5 further comprising:

second means for releasably latching said coupler member to said lower mast member at a selected one of the plurality of different discrete deployed positions defined by said first means.

7. The apparatus of claim 6 wherein said second means includes a latch pin insertable through the selected one of said passages in said coupler member and said single passage through said lower mast member being aligned therewith.

8. The apparatus of claim 1 further comprising:

an elongated preload structure attached along a side of said upper boom member so as to apply a preload force thereto in a direction opposite to a force applied thereto by a load supported by said boom assembly.

9. The apparatus of claim 1 further comprising:

an elongated preload structure attached along a side of said lower mast member so as to apply a preload force thereto in a direction opposite to a force applied thereto by a load supported by said boom assembly.

10. A boom lift apparatus, comprising:

(a) a boom assembly having an elongated lower mast member, an elongated upper boom member and a coupler member connected to a lower end of said upper boom member and an upper end of said lower mast member such that said upper boom member extends in a cantilevered inclined relationship to said lower mast member; and (b) a plurality of different mounting members, each being adapted to mount said boom assembly at a lower end of said lower mast member to a different one of a plurality of different support structures, said different mounting members including (i) a vertical surface-mountable anchor bracket having a tube adapted to receive and seat said lower end of said lower mast member, and a flat plate being attached to said tube between opposite ends and along a side of said tube, said flat plate being adapted for attachment to a vertical surface of a support structure, and (ii) a horizontal surface-mountable anchor bracket having a flat plate adapted for attachment upon a surface of a support structure, and a tube attached at one end upon the flat plate and being adapted to extend outwardly therefrom and receive and seat said lower end of said lower mast member in said tube;

(c) said lower end of said lower mast member when received and seated into either of said tubes of said respective anchor brackets defining a mounting relationship therewith permitting said boom assembly to be rotated relative to said respective anchor bracket.

11. A boom lift apparatus, comprising:

(a) a boom assembly having an elongated lower mast member, an elongated upper boom member and a coupler member connected to a lower end of said upper boom member and an upper end of said lower mast member such that said upper boom member extends in a cantilevered inclined relationship to said lower mast member; and (b) a plurality of different mounting members, each being adapted to mount said boom assembly at a lower end of said lower mast member to a different one of a plurality of different support structures, said different mounting members including (i) a vertical surface-mountable anchor bracket having a tube adapted to receive and seat said lower end of said lower mast member, and a flat plate being attached to said tube between opposite ends and along a side of said tube, said flat plate being adapted for attachment to a vertical surface of a support structure, and (ii) a corner-mountable anchor bracket having a pair of flat plates each being attached to the other along a respective edge thereof so as to dispose said flat plates in an angled relationship with one another and define a corner therebetween matching a corner of a support structure, said flat plates being adapted for attachment to the support structure, and a tube adapted to receive and seat said lower end of said lower mast member, said tube being attached between opposite ends thereof and along a side thereof to said pair of flat plates at said corner thereof;

(c) said lower end of said lower mast member when received and seated into either of said tubes of said respective anchor brackets defining a mounting relationship therewith permitting said boom assembly to be rotate relative to said respective anchor bracket.

12. A boom lift apparatus, comprising:

(a) a boom assembly having an elongated lower mast member, an elongated upper boom member and a coupler member connected to a lower end of said upper boom member and an upper end of said lower mast member such that said upper boom member extends in a cantilevered inclined relationship to said lower mast member; and (b) a plurality of different mounting members, each being adapted to mount said boom assembly at a lower end of said lower mast member to a different one of a plurality of different support structures, said different mounting members including (i) a corner-mountable anchor bracket having a pair of flat plates each being attached to the other along a respective edge thereof so as to dispose said flat plates in an angled relationship with one another and define a corner therebetween matching a corner of a support structure, said flat plates being adapted for attachment to the support structure, and a tube adapted to receive and seat said lower end of said lower mast member, said tube being attached between opposite ends thereof and along a side thereof to said pair of flat plates at said corner thereof, and (ii) a recess-mountible anchor bracket having a tube adapted to extend into a recess defined in a surface of a support structure and to receive ad seat said lower end of said lower mast member in said tube, and a flat plate having a central opening and being attached about said central opening to a receiving end of said tube, said flat plate being adapted for attachment to the surface of the support structure;

(c) said lower end of said lower mast member when received and seated into either of said tubes of said respective anchor brackets defining a mounting relationship therewith permitting said boom assembly to be rotated relative to said respective anchor bracket.

13. A boom lift apparatus, comprising:

(a) a boom assembly having an elongated lower mast member, an elongated upper boom member a coupler member connected to a lower end of said upper boom member and an upper end of said lower mast member such that said upper boom member extends in a cantilevered inclined relationship to said lower mast member; and (b) a plurality of different mounting members, each being adapted to mount said boom assembly at a lower end of said lower mast member to a different one of a plurality of different support structures, said different mounting members including (i) a corner-mountable anchor bracket having a pair of flat plates each being attached to the other along a respective edge thereof so as to dispose said flat plates in an angled relationship with one another and define a corner therebetween matching a corner of a support structure, said flat plates being adapted for attachment to the support structure, and a tube adapted to receive and seat said lower end of said lower mast member, said tube being attached between opposite ends thereof and along a side thereof to said pair of flat plates at said corner thereof, and (ii) a horizontal surface-mountable anchor bracket having a flat plate adapted for attachment upon a surface of a support structure, and a tube attached at one end upon the flat plate and being adapted to extend outwardly therefrom and receive and seat said lower end of said lower mast member in said tube;

(c) said lower end of said lower mast member when received and seated into either of said tubes of said respective anchor brackets defining a mounting relationship therewith permitting said boom assembly to be rotated relative to said respective anchor bracket.

14. A boom lift apparatus, comprising:

(a) a boom assembly having an elongated lower mast member, an elongated upper boom member and a coupler member connected to a lower end of said upper boom member and an upper end of said lower mast member such that said upper boom member extends in a cantilevered inclined relationship to said lower mast member; and (b) a plurality of different mounting members, each being adapted to mount said boom assembly at a lower end of said lower mast member to a different one of a plurality of different support structures, said different mounting members including (i) a vertical sur face-mountable anchor bracket having a tube adapted to receive and seat said lower end of said lower mast member, and a flat plate being attached to said tube between opposite ends and along a side of said tube, said flat plate being adapted for attachment to a vertical surface of a support structure, (ii) a recess-mountable anchor bracket having a tube adapted to extend into a recess defined in a surface of a support structure and to receive and seat said lower end of said lower mast member in said tube and a flat plate having a central opening and being attached about the central opening to a receiving end of the tube, the flat plate being adapted for attachment to the surface of the support structure, (iii) a horizontal surface-mountable anchor bracket having a flat plate adapted for attachment upon a surface of a support structure and a tube attached at one end upon the flat plate and being adapted to extend outwardly therefrom and receive and seat said lower end of said lower mast member in said tube, and (iv) a corner-mountable anchor bracket having a pair of flat plates each being attached to the other along a respective edge thereof so as to dispose said flat plates in an angled relationship with one another and define a corner therebetween matching a corner of a support structure, said flat plates being adapted for attachment to the support structure, and a tube adapted to receive and seat said lower end of said lower mast member, said tube being attached between opposite ends thereof and along a side thereof to said pair of flat plates at said corner thereof;

(c) said lower end of said lower mast member when received and seated into either of said tubes of said respective anchor brackets defining a mounting relationship therewith permitting said boom assembly to be rotated relative to said respective anchor bracket.

* * * * *